INVENTORS.
RONALD R. PROCTOR
ROBERT G. MOYER
BY
ATTORNEY.

Feb. 21, 1967 R. R. PROCTOR ETAL 3,304,612
METHOD AND APPARATUS FOR CONVERTING CARTOGRAPH
COORDINATES TO PERMANENT DIGITAL FORM
Filed Dec. 23, 1963 3 Sheets-Sheet 2

INVENTORS.
RONALD R. PROCTOR
ROBERT G. MOYER
BY
Edward W. Lang
ATTORNEY.

INVENTORS.
RONALD R. PROCTOR
ROBERT G. MOYER
BY Edward H. Ing
ATTORNEY.

United States Patent Office 3,304,612
Patented Feb. 21, 1967

3,304,612
METHOD AND APPARATUS FOR CONVERTING CARTOGRAPH COORDINATES TO PERMANENT DIGITAL FORM
Ronald R. Proctor and Robert G. Moyer, Crystal Lake, Ill., assignors, by mesne assignments, to Union Oil Company of California, Los Angeles, Calif., a corporation of California
Filed Dec. 23, 1963, Ser. No. 332,486
11 Claims. (Cl. 33—1)

This invention relates to measuring devices and more particularly to a device to be used in quickly converting $x$ and $y$ coordinates on a map or other drawing to permanent digital form so that the coordinates may be processed on a computer or put on a $x$, $y$ plotter for duplication to another scale.

Measurements of short distances are made for various purposes in the work connected with many sciences. Frequently it is necessary to measure a large number of short distances or the various points on a map or drawing. For example, the peak height on graphical records such as those obtained in logging of oil wells must be determined and compiled for statistical and other mathematical purposes in geological work.

It is also frequently necessary to measure the coordinates of points in the plane of a map in order to define location, determine distances between points, read values of some property such as elevation at points, etc. For example, in the fitting of mathematical equations to map surfaces such as planes, quadratic surfaces, cubic surfaces, etc., and determining the residual anomalies from the surfaces, the locations of many points on the map and the data at those points is needed. In geology and oil exploration such data might be magnetic, gravitational, geologic structure elevation, and others. Examples of fields other than earth sciences that also use "maps" of many points are two- or three-dimentional yield diagrams of chemical processes, plots of engine efficiency as related to speed and load, and the like.

Various types of equipment have been provided in the past for measuring large numbers of short distances and for reading the locations of points on maps, but they have been expensive, cumbersome, tedious to use, and otherwise deficient.

In accordance with this invention, we have devised simple, relatively inexpensive apparatus for making and recording such measurements. For each measurement made, the devices of this invention provide discrete records which are suitable for many different types of mathematical analysis and provide unlimited flexibility in such analyses.

Accordingly, it is the primary object of this invention to provide novel measuring devices and a method for obtaining cartograph coordinates. Another object of this invention is to provide a measuring device which is readily portable and extremely easy to use. Still another object of this invention is to provide a measuring device which gives a discrete indication of each measurement made. A further object of this invention is to provide a $x$, $y$ map reader. A further object of this invention is to provide a polar-coordinate map reader. These and further objects of this invention will become apparent or will be described as the description herein proceeds and reference is made to the accompanying drawings in which:

Figure 1:
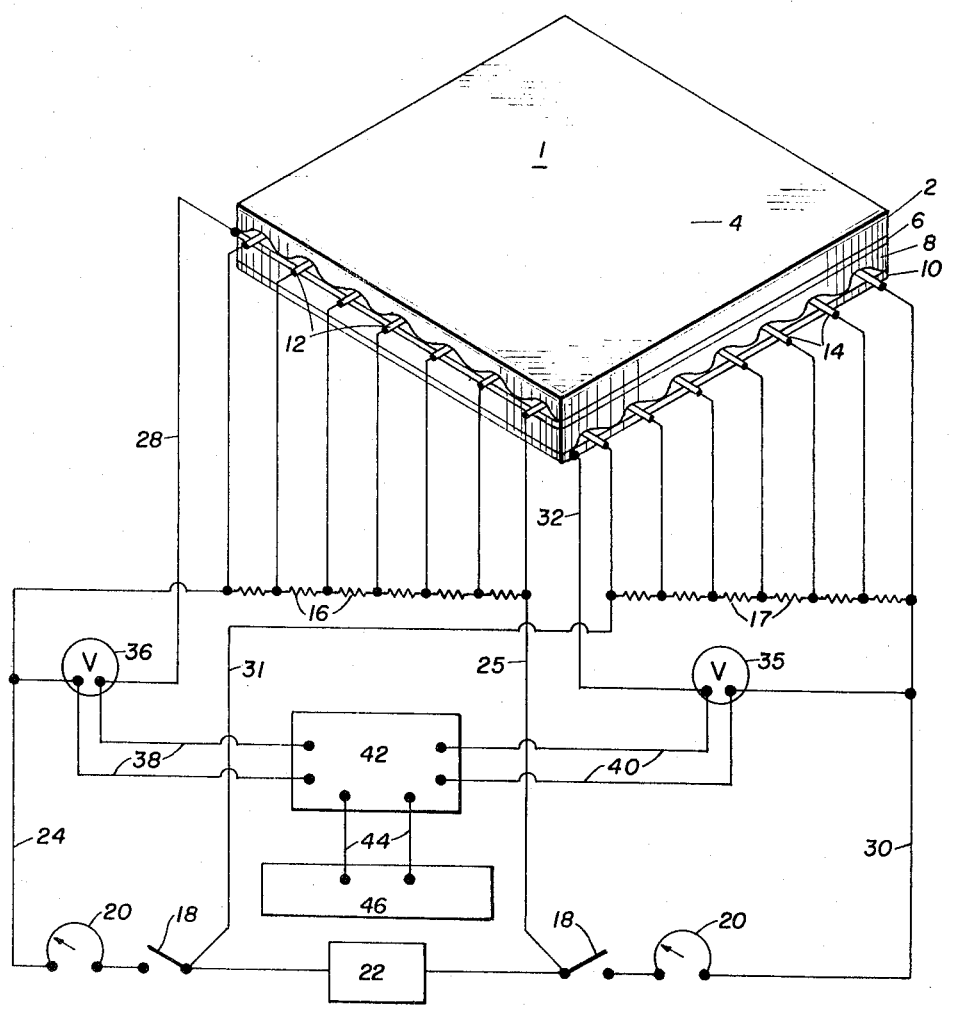
FIGURE 1 is an exploded, plan view of the small-measurement reader in connection with a schematic circuit diagram and of an apparatus for recording measurements made, showing the reader in simplified form for purposes of clarity.

It is to be clearly understood that the figures shown in the various drawings are highly simplified and magnified to clearly show the principles upon which the invention is based. In the actual application of this invention various modifications will become apparent to those skilled in the art wherein normal engineering skill will suffice to satisfactorily perform the adaptations and modifications inherently necessary for specific application of the principles of this invention.

Briefly, the small-measurement reader includes a thin "sandwich" of members which comprises a flexible, resilient, non-conductive member with a plurality of grooves or corrugations provided in one surface in which conductors are disposed in the grooves. A flexible conductive sheet is positioned in juxtaposition to the non-conductive member such that a force applied at a point on either member causes an electrical contact to be made between one or more of the conductors disposed in the grooves of the non-conductive member and the surface of the conductive sheet member. A second non-conductive resilient member identical to the first non-conductive resilient member makes up the third member, but is so positioned that the conductors disposed in the plurality of grooves in its surface are perpendicular or normal to the conductors disposed in the grooves of the first "sandwich" member. A second conductive sheet is positioned in juxtaposition to the second flexible resilient non-conductive grooved member. The same force applied to the surface of the first resilient member which causes electrical contact to be made between one or more of the conductors in the first grooved member and the first conductive sheet of the "sandwich" also causes one or more of the conductors disposed in the grooves of the second grooved member to make electrical contact with the second conductive sheet member. Electrical energizing means provides a known distinct and unique potential to each conductor disposed in each of the grooves of the grooved members. Each conductor therefore has a potential imposed upon it distinct from that of any other conductor. While it is desirable that only one conductor, in any one grooved member, make electrical contact with the conductive sheet, it is possible to achieve a similar degree of measurement wherein more than one conductor makes contact because only the highest potential will be measured. Suitable means are provided for reading the voltages when the conductors in the various grooves of the grooved members make contact with the juxtaposed conductive sheet members. Two voltages are measured at any one point of contact, and these measurements provide the $x$ and $y$ coordinates of the point where pressure is applied on the upper surface of one of the "sandwich" members. The distinct voltages are then translated or "digitized" by suitable means well known in the art for recording on a punch card, paper tape, magnetic tape, etc.

Our $x$, $y$ reader is especially well suited to the making of a large number of measurements within a small limited area such as a photograph, a microscope projection, a recorder chart, a map and the like. It is superior to any prior device for this purpose in that it is versatile, readily portable (except for associated equipment to convert the voltages obtained into permanent records) and extremely easy to use requiring little or no maintenance since no moving parts are involved, the only movement being the movement between members of the "sandwich" which is caused by application of pressure at a point on the surface of one of the sandwich members. More specifically, our device is superior to conventional prior art measuring devices because the device can be used in any position, viz., vertical, horizontal or intermediate slope. It is superior to some other prior art devices inasmuch as it provides records of individual measurements rather than grouped data. Other advantages will be apparent.

Figure 2:
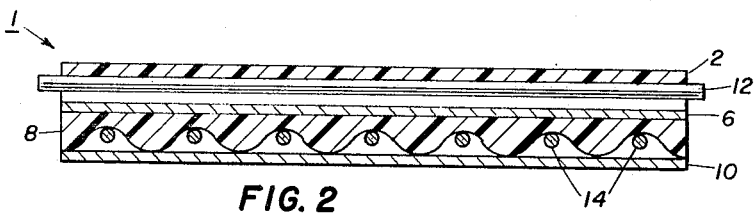
FIGURE 2 is a cross-sectional view of the small-measurement device shown in FIGURE 1.
Figure 3:
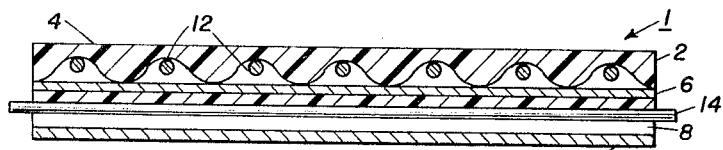
FIGURE 3 is a cross-sectional view of the small-measurement device shown in FIGURE 1 viewed at 90° from FIGURE 2.

This invention is thus understood by reference to the accompanying drawings in which like numerals of reference designate corresponding components in each of the several figures. Referring to FIGURES 2 and 3 the numeral 1 represents the x, y reader. In this embodiment, the x, y reader is made up of a sandwich of four members. The first member 2 is a flexible non-conductive, somewhat resilient grooved or corrugated material such as polyethylene terephthalate having appropriately spaced grooves or valleys in its lower surface in which are disposed a grid of parallel conductors 12, which may be a type of printed conductor, spaced preferably about 0.05 to 0.1 inch apart, although the spacing of the conductors will be governed by the resolution desired. These conductors extend the entire length of the grooves or valleys in which they are situated, extending to the edge of, or preferably slightly beyond the resilient member in which they are disposed to provide adequate clearance for electrical connections. The plurality of conductors are so disposed within the grooves or valleys of the corrugated resilient member that their greatest cross-sectional dimension perpendicular to the lower surface of the corrugated member is less than that of the crest height of the corrugation in which they are disposed. That is to say that conductors 12 will come in contact with the sheet of conductive material 6 only when a force is applied either on the upper surface 4 of member 2 or on the lower surface of member 6. When no force is applied on either surface of the sandwich assembly, conductors 12 are not in contact with conductive sheet 6. Similarly, a second resilient, non-conductive, corrugated or grooved member 8 is positioned below conductive sheet 6 with conductors 14 disposed within the corrugations and being at right angles to conductors 12 in resilient member 2. A second conductive sheet 10 makes up the sandwich package and is positioned below member 8 but, as in member 2, the conductors 14 do not make contact with conductive sheet 10 unless a force is applied on the upper surface of conductive member 2 or on the lower surface of member 10. Conductors 14 disposed in the grooves of member 8 are similary spaced as are conductors 12 in member 2. In addition, the terminal ends of conductors 14 provide sufficient exposed area by which energizing means can be attached to conductors 14.

Referring now to FIGURE 1, numeral 1 depicts the x, y reader in relation to the electric circuitry comprising the complete apparatus. Power source 22 is connected to switches 18 which energize the voltage dividers thru calibrating rheostats 20. Conductors 24 and 25 are connected to precalibrated resistors 16 the midpoints or junctions of which in turn are connected to the grid of conductors 12 disposed in the grooves of corrugated member 2. Resistors 16 serve as a voltage divider imposing discrete and distinct potentials on each of conductors 12. Conductor 24 also connects to voltmeter 36. Lead wire 28 connects voltmeter 36 and conductive sheet 6. Similarly, lead wires 30 and 31 energize precalibrated resistors 17 which are connected to the terminal ends of conductors 14 disposed in the parallel grooves of member 8. Conductor 30 also connects to voltmeter 35. Lead wire 32 connects voltmeter 35 and conductive sheet 10. Lead wires 38 and 40 connect voltmeters 36 and 35 respectively to dual-circuit translator 42 which translates the voltages obtained on voltmeters 35 and 36 into decimal digit signals. Lead wires 44 connect translator 42 with recording means 46 which records the decimal number on a punch card, paper tape, magnetic tape, etc.

In lieu of resistors 16 and 17, which act as voltage-dividing means furnishing a unique predetermined potential to each of the conductors disposed in either resilient member 2 or 8, a material of precalibrated high resistance, such as a carbon bar can be placed in contact with the electrical conductors 14 and 12 such that unique predetermined potentials are provided to each one of the several conductors 14 and 12.

It should be noted that conductors 12 and 14, while it is preferred that they be of a printed circuit type, may be any of the conventional types of conducting media such as wire, conduit, etc. The size of the conductors, i.e., length, cross-sectional area, etc., and conductance likewise are immaterial, it being only necessary that all of the conductors be of similar electrical characteristics. The resilient non-conductive corrugated members may be any shape and size suitable to accommodate the graph, map, etc., from which measurements or x, y readings are to be taken. The corrugated members should be sufficiently flexible and resilient so as to be easily depressed when a moderate force is applied to their surface. Suitable materials from which these members may be fashioned are those having excellent electrical insulating properties such as polyethylene terephthalate, known commercially as "Mylar," and other materials such as polypropylene, methyl methacrylate, polystyrene, polytetrafluoroethylene, polytrichlorofluoroethylene, polyvinylidene fluoride, polyvinyl fluoride and laminates thereof. The conducting sheets 6 and 10 may be of any of the well-known electrically conductive metals such as aluminum, copper, silver, nickel, platinum, etc., and alloys thereof, either as a metallic sheet or as a film deposited on a sheet of plastic. In the embodiment shown in FIGURE 1, conductive sheet 6 is sufficiently flexible to transmit any point force applied at surface 4 to resilient grooved member 8.

In using the apparatus illustrated in FIGURE 1, switches 18 are closed energizing lead wires 30, 31, 25 and 24 which in turn provides a regulated potential to each set of resistors 16 and 17. Resistors 16 therefore provide known and distinct potentials to each of conductors 12, and resistors 17 provide known and distinct potentials to each of conductors 14. A map or diagram is placed on the upper surface 4 of the x, y reader 1 and a stylus or other blunt instrument pressed into the map or diagram causes the grooved resilient member 2, directly under the stylus, to deflect, which in turn causes conductor 12 to make contact with conducting sheet 6, completing the circuit and impressing the corresponding voltage of the conductor on conducting sheet 6 and lead wire 28, which voltage is transmitted via the connecting lead 28 to voltmeter 36. Voltage registered on voltmeter 36 is transmitted via lead wires 38 to translator 42 which translates the x coordinate into decimal form, and the decimal form signal is transmitted via lead wires 44 to unit 46 adapted to record the decimal number on a punch card, paper tape, magnetic tape, etc. The same pressure brought to bear by the stylus on surface 4 also depresses flexible member 6 causing resilient flexible corrugated member 8 to depress bringing in contact one of the conductors 14 with conductive sheet 10. In completing this circuit, conductive sheet 10 and lead wire 32 transmit the voltage of the conductor under the stylus to voltmeter 35, which voltage is also transmitted to translator 42 via lead wires 40; the y coordinate voltage thus is translated to decimal form and transmitted via connectors 44 to unit 46 for recordation along with the x voltage obtained as hereinbefore described.

Figure 4:
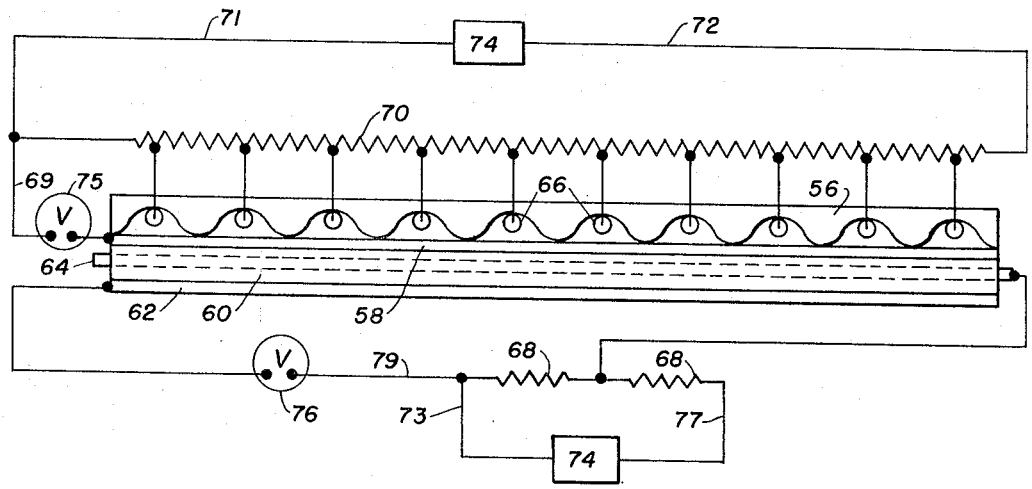
FIGURE 4 is a greatly simplified front view of an alternate embodiment of this invention, showing electrical circuitry, of a polar coordinate reader.
Figure 5:
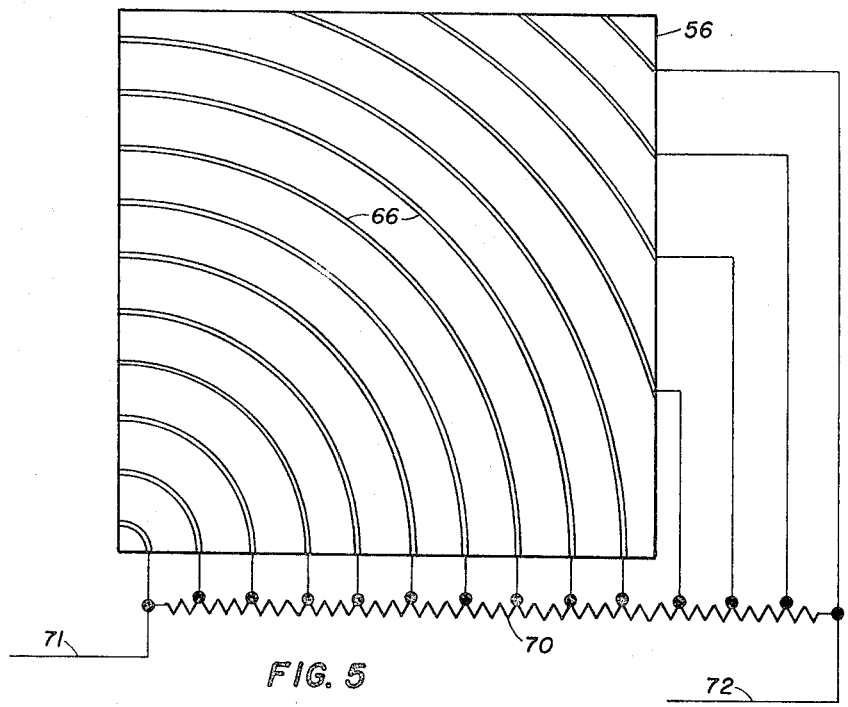
FIGURES 5 and 6 are bottom views of two of the components depicted in FIGURE 4.
Figure 6:
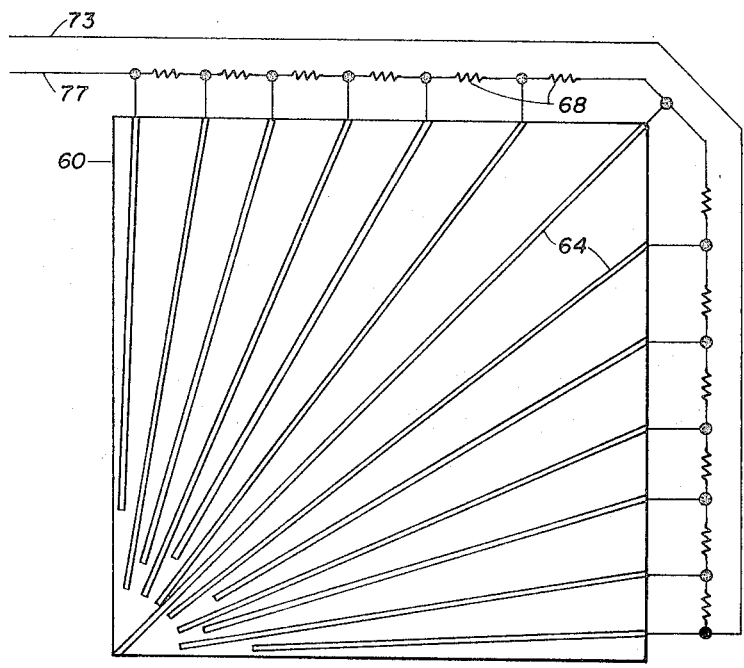

FIGURES 4, 5 and 6 illustrate the polar coordinate embodiment of this invention, showing a small number of elements for purposes of clarity, with like numerals designating like elements in each figure. In this embodiment, grooved resilient member 56 has disposed in one of its surfaces a plurality of circular segments of electrical conductors 66 concentrically arranged connected to voltage-dividing means 70, here depicted as a continuous, uniformly tapped resistor. In juxtaposition to resilient member 56 is disposed conductive platen 58. Regulated power source 74 is connected to voltage-dividing means 70 via conductors 72 and 71. Conductor 69 connects conductor 71 to voltmeter 75, which is provided to register the voltage impressed upon platen 58 when at least one of the conductors 66 comes in contact with platen 58.

Non-conductive resilient grooved member 60 is disposed beneath conductive resilient platen 58 and has disposed on its bottom surface a plurality of radial grooves, each groove being at a predetermined angle with respect to a given reference point on member 60. Conductors 64 disposed within the grooves of member 60 are connected to voltage dividing means 68. Wires 73 and 77 connect resistors 68 to regulated power source 74. Conductor 79 connects wire 73 to voltmeter 76 which is provided to register the voltage impressed upon platen 62 when at least one of the conductors 64 comes in contact with platen 62. Referring specifically to FIGURE 5 wherein a bottom view of member 56 is shown, the concentricity of the conductors 66 is readily apparent, it being understood that conductors 66 are disposed within grooves, each groove having a trough depth greater than the greatest cross-sectional dimension of the conductor disposed in each of the grooves. FIGURE 6 shows the second resilient non-conductive member 60 with radial conductors 64 and voltage-dividing resistor 68. Similarly, conductors 64 are disposed in the grooves of member 60 such that the sides of each groove keep its respective conductor out of electrical contact with a juxtaposed planar conductive surface, unless a force is applied to one of the members. The mode of operation is similar to that hereinbefore described.

Figure 7:
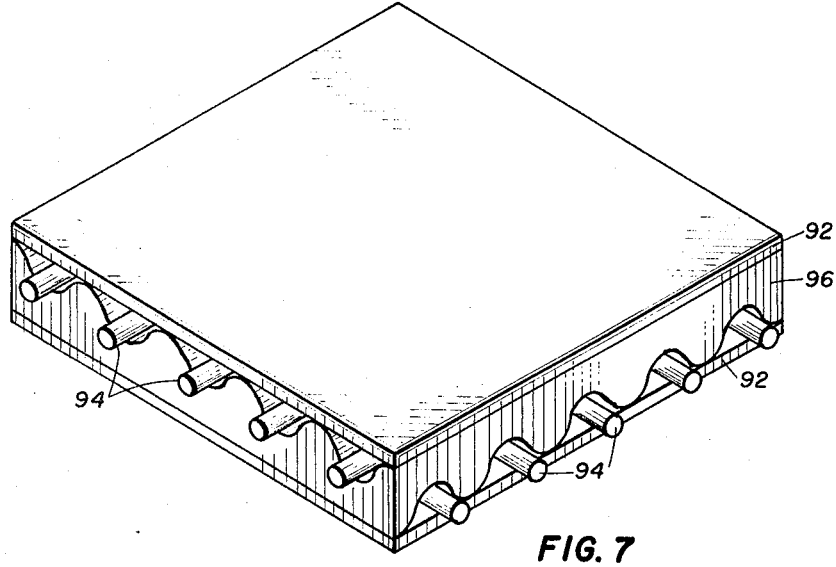
FIGURE 7 shows an alternate embodiment of one of the essential components of this invention.
Figure 8:
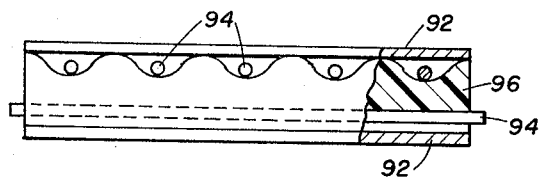
FIGURE 8 depicts a side view, in partial cross-section, of the embodiment shown in FIGURE 7.

FIGURE 7 is an isometric view of another embodiment of the invention, without circuitry, in which 96 represents a resilient member having parallel grooves on the opposite surfaces of said member. The grooves on one side are at right angles to the grooves on the corresponding opposite side of member 96. Conductors 94 are disposed within the grooves of member 96 and are brought in physical contact with conductive sheets 92 when a force is applied to either one of members 92. FIGURE 8 is a side view of FIGURE 7 showing the perpendicular relationship of conductors 94 disposed in the grooves of member 96 with conductive sheets 92 in juxtaposition to conductors 94.

While specific embodiments of the invention have been described in reference to a x, y and polar coordinate map reader, it is not to be constructively limited thereto. Other modifications will be apparent to those skilled in the art without violating the spirit of the herein described invention. For example, by using one of the resilient flexible members in which is disposed the grid of parallel conductors in the grooves of said flexible member, together with a single conductive sheet, it will be apparent that a reading will be obtained in either the x or y direction depending upon the measurement desired and the reference point established. Similarly, x and y readings may be obtained by the use of a single conductive sheet disposed between two grooved members such that the grid of conductors disposed in the grooved members make contact with the upper and under surfaces of the conductive sheet respectively upon the application of a force. In this instance means are provided to energize only one of the grids of conductors at a time and means provided to electrically isolate one grooved member from the power supply and the translator while the measurements are being taken on the other grooved member.

The embodiments of this invention in which an exclusive property or privilege is claimed are defined as follows:

1. In a measuring device for converting the coordinates of a point on a cartograph to permanent digital form, a first grid comprising a plurality of spaced, substantially parallel conductors; a second similar grid also comprising a plurality of substantially parallel, spaced conductors; said grids being in normal relationship with respect to each other; said grids being supported by at least one electrically con-conductive member; first and second electrically conductive means disposed in juxtaposition to the corresponding grids; resilient means adapted to maintain said grids and said conductive means out of electrical contact with respect to each other but to permit contact upon the application of compressive force thereby causing a discrete number of conductors in both said first and second grids to make electrical contact with said conductive means; a voltage-dividing means connected to said conductors; a power source means to connect said voltage-dividing means to said power source; means for measuring the voltages impressed by said voltage dividing means on said conductors; means for translating said voltages into decimal digit signals and means for recording said signals.

2. An apparatus in accordance with claim 1 including a sandwich assembly wherein said electrically conductive means are metal platens disposed in juxtaposition to the corresponding grids.

3. An apparatus in accordance with claim 2 wherein said grids are disposed on opposite surfaces of one electrically non-conductive member and said conductive means in juxtaposition to said grids are metal platens at least one of which is substantially yieldable.

4. An apparatus in accordance with claim 2 wherein said conductors are connected to voltage-dividing means consisting of high-resistance carbon bars.

5. An apparatus in accordance with claim 2 wherein said non-conductive members are resilient and corrugated, and the conductors of said grids are secured in the grooves of said corrugated members.

6. An apparatus in accordance with claim 2 wherein at least one of said platens is substantially yieldable.

7. A measuring device comprising in combination a flexible non-conductive member having a planar surface and a parallel-grooved surface; a plurality of spaced electrical conductors secured singularly in and coextensive with said grooves, said grooves having a crest height greater than the largest cross-sectional dimension of the conductors secured in said grooves; a first substantially flexible and planar sheet member of an electrically conductive material juxtaposed against said flexible non-conductive member adjacent to but normally spaced from said conductors whereby a discrete number of said conductors contact said flexible planar sheet when a compressive force is applied to the planar surface of said grooved member; a second flexible non-conductive grooved member similar to said first grooved member backing against said flexible planar sheet and having its planar surface in contact with said sheet and having its grooves and conductors secured therein perpendicular to the grooves and conductors of said first grooved member; a second planar sheet member positioned in physical contact with said second grooved member adjacent to but normally spaced from the conductors secured therein; a voltage-dividing means electrically connected to said conductors secured in said grooves whereby a predetermined unique potential may be imposed upon each conductor; means to connect said voltage-dividing means to a power source; means for connecting said planar sheets to an electrical circuit with said conductors and voltage-dividing means and means for measuring the imposed potential when any discrete number of conductors make contact with the juxtapositioned planar sheet.

8. A device for converting a coordinate of a point or a cartograph to permanent digital form comprising in combination an electrically non-conductive member having secured thereto first and second grids disposed in normal relationship, each comprising a plurality of conductors substantially coextensive with opposite sides of said member; first and second electrically conductive means adjacent to said grids; resilient means adapted to maintain said conductors and said conductive means out of contact with respect to each other but to permit contact upon the application of a compressive force thereby causing a discrete number of conductors to make electrical contact with said conductive means; a power source; voltage dividing means; means to electrically connect said conductors through said voltage dividing means to said power source; means for measuring the voltages impressed by said voltage dividing means on said conductors; means for translating said voltages into decimal digit signals and means for recording said signals.

9. A measuring device comprising in combination a first yieldable non-conductive member having secured thereon a grid comprising a plurality of circular segments of conductors concentrically arranged substantially coextensive with said member; a second electrically non-conductive member having secured thereon a second grid comprising a plurality of conductors in radial arrangement with respect to each other; first and second electrically conductive means in juxtaposition to said grids; resilient means adapted to maintain said grids and said conductive means out of contact with respect to each other but to permit contact upon the application of a compressive force thereby causing a discrete number of said conductors in said first and second grids to make electrical contact with said conductive means; a power source; voltage dividing means; means to electrically connect said conductors of said grids through said voltage dividing means to said power source; means for measuring the voltages impressed by said voltage dividing means on said conductors; means for translating said voltages into decimal digit signals and means for recording said signals.

10. An apparatus in accordance with claim 9 wherein said first and second non-conductive members are yieldable and arcuate, said first member having concentric grooves in which said conductors are secured; said second member having a plurality of grooves in radial arrangement in which said conductors are secured, the sides of said grooves forming said resilient means.

11. A method of obtaining the $x$ and $y$ coordinates of a point on a cartograph in representative electrical form, wherein said cartograph has abscissa and ordinate reference axes, which comprises aligning one of said reference axes with at least one of a first plurality of spaced, substantially parallel electrical conductors substantially coextensive with said cartograph and aligning the other axis with at least one of a second plurality of spaced, substantially parallel electrical conductors substantially coextensive with said cartograph, said first plurality of conductors being in normal relationship with respect to said second plurality of conductors, impressing a different electrical potential on each conductor, said potentials impressed on said first plurality of conductors representing integers corresponding to a given distance on said cartograph from said abscissa axis and said potentials impressed on said second plurality of conductors representing integers corresponding to a given distance on said cartograph from said ordinate axis; maintaining said conductors in normally open circuit; selecting a point on the cartograph, closing the circuit of those conductors passing through or contiguous to said point and simultaneously determining electrical potentials on said last mentioned conductors; translating said potentials into decimal digit signals and recording said signals.

References Cited by the Examiner

UNITED STATES PATENTS

| | | | |
|---|---|---|---|
| 2,500,935 | 3/1950 | Deitz | 33—1 |
| 2,525,841 | 10/1950 | Sturm et al. | 346—32 X |
| 2,610,102 | 9/1952 | Gitzendauner et al. | |
| 2,704,305 | 3/1955 | McLaughlin | 178—18 |
| 2,784,001 | 3/1957 | Simjian | 273—102.2 |
| 2,817,831 | 12/1957 | Johnson et al. | |
| 2,975,235 | 3/1961 | Leitner | 178—18 |
| 3,061,026 | 10/1962 | Hecox et al. | 177—13 |
| 3,101,547 | 8/1963 | Westphal | 33—1 |
| 3,134,099 | 5/1964 | Woo | 340—347 |
| 3,151,927 | 10/1964 | Angst et al. | 346—29 X |

LEONARD FORMAN, *Primary Examiner.*

ISAAC LISANN, *Examiner.*

W. D. MARTIN, *Assistant Examiner.*